United States Patent [19]

Clark et al.

[11] 4,291,258
[45] Sep. 22, 1981

[54] DC EXCITATION CONTROL FOR LINEAR OSCILLATING MOTORS

[75] Inventors: Howard L. Clark, Ballston Lake; Richard A. Dorman, Troy; Paul Back, Clifton Park, all of N.Y.

[73] Assignee: Mechanical Technology Incorporated, Latham, N.Y.

[21] Appl. No.: 160,305

[22] Filed: Jun. 17, 1980

[51] Int. Cl.³ ............................................ H02K 33/00
[52] U.S. Cl. ...................... 318/124; 318/135; 318/687
[58] Field of Search .............. 318/135, 123, 124, 125, 318/132, 687

[56] References Cited

U.S. PATENT DOCUMENTS

| | | | |
|---|---|---|---|
| 3,201,670 | 8/1965 | Myers | 318/125 |
| 3,612,967 | 10/1971 | Lee | 318/123 |
| 3,706,018 | 10/1972 | Morris et al. | 318/125 |
| 3,855,485 | 12/1974 | Matusi et al. | 318/135 X |
| 3,891,874 | 6/1975 | Roters | 318/123 X |

*Primary Examiner*—B. Dobeck
*Attorney, Agent, or Firm*—Joseph V. Claeys; John M. Neary

[57] ABSTRACT

A control method and system for quasi-proportionally controlling the magnitude of DC excitation current supplied to the DC field coil windings of a linear reciprocating motor in proportion to the magnitude of the AC excitation current supplied to the AC field coil windings of the motor.

11 Claims, 2 Drawing Figures

DC EXCITATION CONTROL FOR LINEAR OSCILLATING MOTORS

TECHNICAL FIELD

This invention relates to electrodynamic linear oscillating (reciprocating) motors.

More particularly, the invention relates to a new and improved method and control system for controlling DC excitation of linear reciprocating electric motors.

BACKGROUND PROBLEM

U.S. Pat. No. 3,891,874, issued June 24, 1975, by Herbert C. Roters, inventor for a "Compensated Reciprocating Electrodynamic Machine"—assigned to Mechanical Technology, Incorporated of Latham, New York, describes a reciprocating electrodynamic linear motor of the type to which the present invention relates. Where linear reciprocating motors of the type described in U.S. Pat. No. 3,891,874 are used to provide the primary moving force in resonant free piston compressors of the type described in U.S. Pat. No. 3,937,600, issued Feb. 10, 1976, by Harlan V. White, inventor—entitled "Controlled Stroke Electrodynamic Linear Compressor," and in U.S. Pat. No. 4,067,667, issued Jan. 10, 1978, by Harlan V. White—inventor for a "Controlled Stroke Electrodynamic Oscillating Motor Compressor," both assigned to Mechanical Technology, Incorporated, certain inefficiencies are introduced by operating the linear reciprocating motor in the classical manner with a fixed magnitude DC field coil winding current over the complete operating range of the motor, as taught by U.S. Pat. No. 3,891,874. To overcome these inefficiencies the present invention was devised.

DISCLOSURE OF INVENTION

It is therefore a primary object of the invention to provide a new and improved method and control system for operating and controlling operation of electrodynamic linear oscillating (reciprocating) motors having both DC and AC field coil windings whereby the magnitude of the DC excitation current supplies to the DC field coil windings are controlled in a manner so that the DC coil current is quasi-proportional to the magnitude of the AC field coil excitation current and does not remain at a fixed magnitude value over the entire output power operating range of the motor. "Quasi-Proportional" as used herein refers to a DC current having a preselected constant low threshold value up to a predetermined alternating current value above which the DC current is proportional to the alternator current.

A feature of the invention is the provision of a control method and system for quasi-proportionally controlling the magnitude of DC excitation current supplied to the DC field coil of a linear reciprocating motor in proportion to the magnitude of the AC excitation current supplied to the AC field coils of the motor. The control method and system employs an AC coil current sensing means for sensing the magnitude of the AC current flowing in the AC coils of the linear reciprocating motor and deriving a control signal representative of the magnitude of the AC coil current. Phase controlled rectifier circuit means supplied with alternating current from the source of alternating current power and with the control signal voltage representative of the magnitude of the AC coil current then operates to rectify a portion of the AC supply in proportion to the magnitude of the AC coil current and supplies the quasi-proportionally controlled rectified DC output as excitation current for the linear motor DC field coil windings.

Another feature of the invention is the provision of a method and control system incorporating the above described features which further include DC coil current sensing means for sensing the magnitude of the DC excitation current flowing in the DC coil windings of the linear motor and deriving a DC feedback signal voltage representative of the magnitude of the DC field coil current. Difference amplifier circuit means are responsive to both the DC feedback signal and the control signal voltage representative of the magnitude of the AC coil current for deriving an output difference control signal voltage for controlling operation of the phase control rectifier means in response to any difference between the two values.

BRIEF DESCRIPTION OF DRAWINGS

These and other objects, features and many of the attendant advantages of this invention will become better understood from a reading of the following detailed description when considered in conjunction with the accompanying drawings wherein; like parts in each of the several figures are identified by the same reference character; and wherein.

BEST MODE OF CARRYING OUT THE INVENTION

It has been determined that in an oscillating (reciprocating) linear electrodynamic motor, the DC field coil excitation causes approximately one-third of the total loss at the full power rating of the motor. The remainder of the power loss is proportional to the square of the AC current supplied to the AC field coil windings of the motor. At less than full power operation, it is known that the AC current supplied to the AC coils decreases approximately as the power output decreases. As a consequence, the AC current losses then decrease as the square of the decrease in the AC current.

In contrast to the varying AC current excitation of the AC coils of the motor, the DC coil field current normally is held constant as the motor is operated over its full power range as described in U.S. Pat. No. 3,891,864. Consequently, where the motor is operated at less than full power, the loss attributable to the DC field excitation becomes a much larger percentage of the total loss experienced by the motor at the power setting in question. In order to decrease the losses attributable to the DC coil field current, it is proposed in the present invention to operate the linear motor at a field current which gives maximum efficiency at any given power level of operation for the motor. It has been determined that if the DC field current is made quasi-proportional to the AC current, very close to optimum conditions can be obtained.

Figure 1:
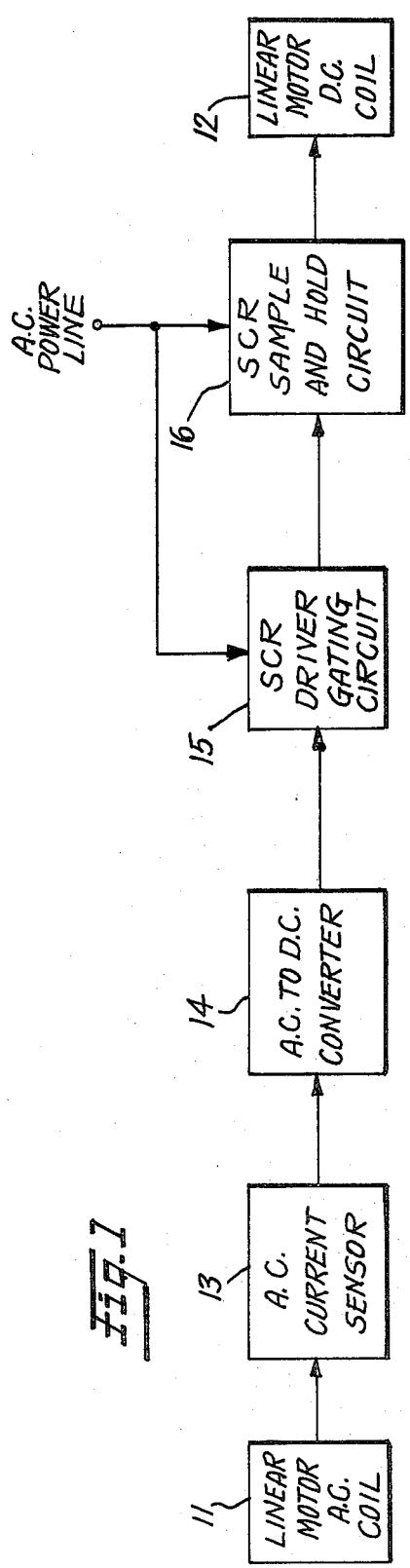
FIG. 1 is a functional block diagram illustrating the novel method and control system according to the invention for quasi-proportionally controlling the magnitude of DC excitation current supplied to the DC field coil winding of a linear reciprocating motor.

In order to achieve efficient operation of a linear reciprocating motor over the entire range of its operating conditions in accordance with the considerations set forth above, it is necessary to establish a relationship between the magnitude value of the DC current supplied to the DC field coil windings and the magnitude of the AC current supplied to the AC field coil windings. For this purpose, an arrangement such as that shown in FIG. 1 of the drawings, is provided. In FIG. 1, the AC coil windings of a linear reciprocating motor are shown schematically at 11 and the DC coil windings of the same motor are shown schematically at 12. An AC current sensor 13 is installed in series with the AC coil 11 for sensing the magnitude of the AC current flowing in AC coil 11 and deriving a control signal voltage representative of the magnitude of the AC coil current. The AC current sensor 13 preferably comprises a small current transformer having its sensing winding connected in series with a conductor supplying the AC coil 11 and which derives an output AC control signal voltage representative of the magnitude of the AC coil current. This AC control signal voltage is supplied to a DC signal converter circuit 14 whose input is supplied to the output from the AC coil current sensor 13. The AC to DC converter 14 may comprise a conventional signal voltage level rectifying and filter network which extracts the rms value of the input AC signal voltage and produces an output DC voltage which is quasi-proportional in magnitude to the value of the AC signal voltage and accordingly is representative of the AC coil current magnitude. That is, the output of converter circuit 14 is a DC current having preselected constant low threshold value up to a predetermined AC value above which the DC current is proportional to the AC value.

The DC control signal voltage derived by converter circuit 14 is supplied as the input gating signal to an SCR driver gating circuit 15 which in turn controls the operation of a phase controlled SCR sample and hold circuit 16 whose output is supplied as the DC excitation current to DC coil 12. The SCR driver-gating circuit 15 may comprise any of the known SCR gating circuits such as those described in Chapter 5 of the textbook entitled "Semiconductor Controlled Rectifiers—Principles and Applications of p-n-p-n Devices" by F. E. Gentry, F. W. Gutzwiller, Nick Holonyak, Jr., and E. E. Von Zastrow published by Prentice Hall, Inc. of Englewood Cliffs, N.J.—copyrighted 1964—Library of Congress Catalog Card #64-21172—printed in the United States of America and also in Chapter 4 of the "SRC Manual" (Fifth Edition) published by the General Electric Company—Semiconductor Products Department—Electronics Park, Syracuse, N.Y. 13201—D. R. Grafham and J. C. Hey—Editors. The SCR sample and hold circuit may comprise one of the known phase control circuits such as those described in Chapter 8 of the above-referenced "Semiconductor Controlled Rectifiers" textbook or in Chapter 9 of the above-referenced "SCR Manual." In order to assure synchronism between the operation of the SCR driver gating circuit and the SCR sample and hold circuit 16, the same AC power source which supplies the circuit 16 also is applied to the SCR driver-gating circuit 15. In operation, the SCR driver-gating circuit 15 creates a gating-on pulse whose position in time (relative to the phase of the AC power being supplied to the SCR sample and hold circuit 16) is a function of the value of the input DC control signal voltage supplied from converter 14. This gating on pulse then is supplied to the SCR sample and hold circuit 16 and determines the point in the phase of the supply AC power at which the SCR phase control circuit 16 turns on. This process controls the voltage level of the essentially rectified and filtered voltage appearing at the output of the SCR sample and hold circuit 16. and determines the point in the phase of the supply AC power at which the SCR sample and hold circuit 16 turns on. This process controls the voltage level of the essentially rectified and filtered voltage appearing at the output of the SCR sample and hold circuit 16. This sample voltage is held across a large capacitor comprising a part of the sample and hold circuit 16 that slowly discharges into the linear motor DC coil 12 which together with the DC inductance supplies coil 12 with an excitation DC current that is quasi-proportional in magnitude to the value of the excitation current flowing in the AC coil 11.

In preferred constructions of the circuit arrangement shown in FIG. 1, the SCR (silicon controlled rectifier) employed in the SCR sample and hold circuit 16 is of the light activated type as described in Chapter 14 of the above-referenced "SCR Manual" and in Section 5.3 of the "Semiconductor Controlled Rectifiers" textbook. Where the SCR in circuit 16 is of the light activated type, the driver-gating circuit 15 will employ a light emitting diode and the output pulse supplied from the gating circuit 15 to the sample and hold circuit 16 will be in the form of a light pulse transmitted to a light sensitive element such as a light activated diode, light activated transistor, or light activated SCR comprising a part of the sample and hold circuit 16. In order to maximize the optical coupling between the light emitting element of the gating circuit 15 and the light activated element of the sample and hold circuit 16, the light emitting element and the light activated element are in close proximity inside of a single unit and is used to gate on a power SCR. By the use of such an optically coupled gating circuit arrangement, isolation between the signal voltage level circuits comprising elements 13, 14 and 15, and the power level circuits comprising elements 16 and 12 can be obtained at a relatively low increase in cost of the system. The improved safety and reduction of maintenance costs due to possible burn-out of signal level elements, etc., more than justifies the cost of the improved isolation.

Figure 2:
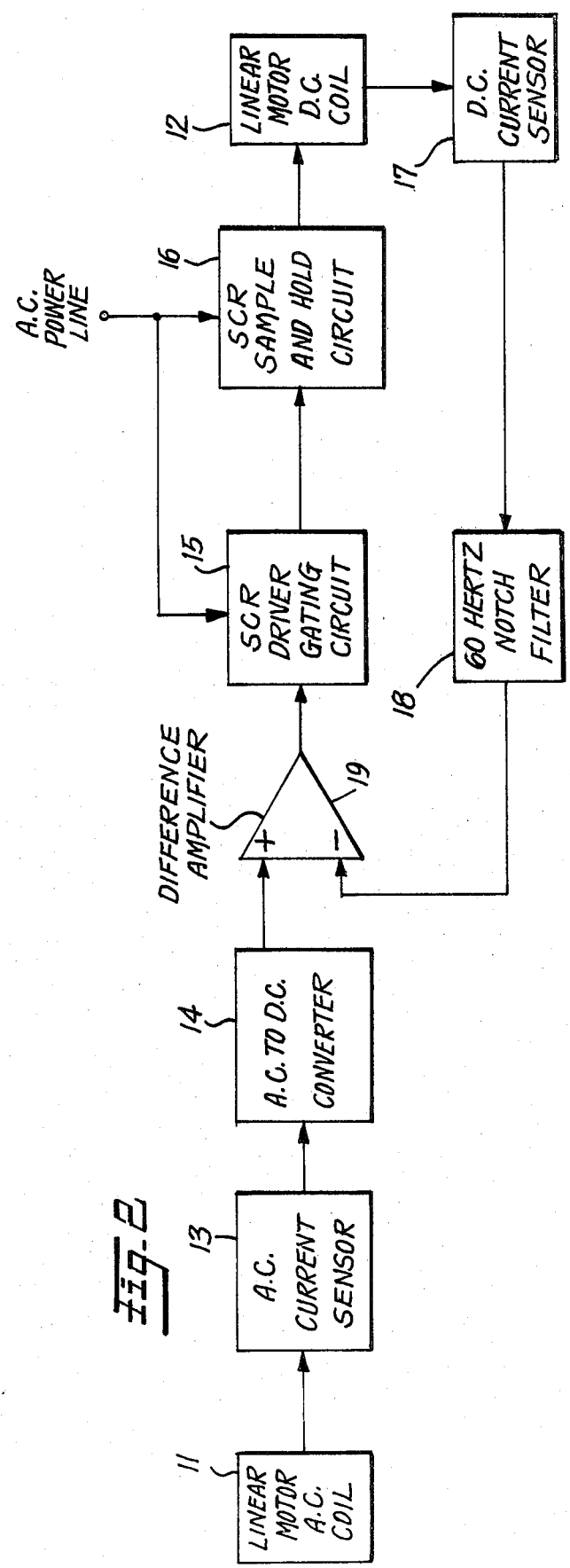
FIG. 2 is a functional block diagram of a second embodiment of the invention which provides for more stable operation of the method and system for controlling DC excitation of the DC field coil of a linear reciprocating motor according to the invention through feedback control.

FIG. 2 of the drawings illustrates a modified form of the circuit arrangement shown in FIG. 1 wherein a DC coil current sensing circuit 17 is provided for sensing the magnitude of the DC excitation current flowing through the DC coil 12 of the linear motor. The DC current sensor 17 may comprise a low resistance sensing resistor connected in series with the DC coil 12 for deriving a DC feedback signal voltage representative of the magnitude of the DC coil current. The DC feedback signal voltage derived by DC current sensor 17 is supplied through a 60 cycle/second (60 Hertz) feedback signal filter circuit 18 and applied to one input terminal of a difference amplifier 19. The filter circuit 18 operates to filter out any superimposed 60 Hertz frequency components present in the DC feedback signal and supplies the filtered DC feedback signal voltage as one of the inputs to the difference amplifier 19. Difference amplifier 19 may comprise a conventional, commercially available, integrated circuit operational amplifier available commercially from a number of semiconductor integrated circuit manufacturers such as RCA, Texas Instruments, National Semiconductor Corporation, etc. The amplifier 19 is interconnected in accordance with the manufacturer's directions to operate as a difference amplifier and has connected to the remaining input terminal thereof the DC control signal voltage representative of the AC coil current magnitude derived from the output of the AC to DC converter circuit 14. Difference amplifier 19 operates to derive an output difference control signal voltage which is applied as the input to the SCR driver-gating circuit 15 for controlling turn-on of the SCR means of the SCR sample and hold circuit 16.

From the above brief description, it will be appreciated that the circuit of FIG. 2 operates in much the same manner as the circuit of FIG. 1 with the exception of the provision of closed loop control over the magnitude of the linear motor DC coil excitation current made possible by the inclusion of the DC current sensor 17, filter 18 and difference amplifier 19. Because of this arrangement, any difference in value between the feedback sensed actual DC coil excitation current value supplied to one input of difference amplifier 19 and the sensed value of the AC coil excitation current supplied via AC current sensor 13 and AC to DC converter 14 to the remaining input terminal of difference amplifier 19 results in an error or difference control signal voltage that is employed in driving the output of the SCR sample and hold circuit 16 in a direction which reduces the error or difference signal toward zero in accordance with well known feedback circuit control principles. Similar to the FIG. 1 circuit arrangement, if desired, improved isolation can be obtained between the signal voltage level circuitry and the power voltage level circuitry by employing optical coupling techniques between the SCR driving-gating circuit 15 and the SCR sample and hold circuit 16.

Industrial Application

The invention makes available a new method and control system for controlling the operation of electrodynamic linear oscillating (reciprocating) motors of the type employed in free resonant piston compressors such as those described in U.S. Pat. Nos. 3,937,600 and 4,067,667 whereby such motors and compressors operate more efficiently over their entire output power operating range.

From the foregoing description it will be appreciated that the invention provides a new and improved method and control system for operating electrodynamic linear oscillating (reciprocating) motors having both DC and AC field coil windings whereby the magnitude of the DC excitation current supplied to the DC field coil windings is controlled in a manner so that the DC coil current varies in quasi-proportion to the magnitude of the AC field coil excitation current and does not remain fixed in value over the full output power range of the motor.

Having described two embodiments of a new and improved method and control system for controlling DC excitation of linear oscillating (reciprocating) electrodynamic motors in accordance with the invention, it is believed that other modifications, variations and changes in the embodiments of the invention disclosed will be apparent to those skilled in the art in the light of the above teachings. It is therefore to be understood that any such changes are believed to be encompassed by the true spirit and scope of the invention as defined by the appended claims.

What is claimed is:

1. A control system for proportionally controlling the magnitude of DC excitation current supplied to the DC field coil of a linear reciprocating motor in quasi-proportion to the magnitude of the AC excitation current supplied to the AC field coil of the motor; said control system comprising AC coil current sensing means for sensing the magnitude of the AC current flowing in the AC coils of the linear reciprocating motor and deriving a control signal voltage representative of the magnitude of the AC coil current, and means responsive to the control signal voltage for deriving an output DC coil excitation current which is quasi-proportional to the magnitude of the AC coil excitation current for supply to the DC field coil of the linear motor.

2. A control system according to claim 1 wherein said last-mentioned means for deriving the output DC coil excitation current comprises phase controlled rectifier circuit means supplied with alternating current from a source of alternating current power, said phase controlled rectifier circuit means serving to rectify a portion of the AC supply in proportion to the magnitude of the control signal voltage and supplying the output quasi-proportionally controlled rectified DC excitation current to the linear motor DC coil.

3. A control system according to claim 2 wherein said phase controlled rectifier means comprises silicon control rectifier (SCR) means having the load terminals thereof interconnected with the AC power source and with voltage holding circuit means connected to and supplying the DC field coil with quasi-proportionally rectified and filtered DC current supplied through the SCR means, and further includes SCR driver gating circuit means responsive to the control signal voltage and the AC supply voltage from the AC power source, the SCR means having the gate electrode thereof coupled to the output from the SCR driver gating circuit means for gating on the SCR means at particular points in the phase of the AC supply voltage as determined by the magnitude of the control signal voltage.

4. A control system according to claim 3 wherein said AC coil current sensing means derives an AC control signal voltage representative of the magnitude of the AC coil current and the control system further includes AC signal to DC signal converter means responsive to the AC coil current sensing means output for converting the AC control signal voltage to a DC control signal voltage representative of the AC coil current magnitude, said DC control signal voltage being supplied to the SCR driver gating circuit means for controlling turn-on of the SCR means at particular points in the phase of the AC supply voltage.

5. A control system according to claim 1 further including DC coil current sensing means for sensing the magnitude of the DC excitation current flowing in the DC coil of the linear motor and deriving a DC feedback signal voltage representative of the magnitude of the DC coil current, DC feedback signal filter circuit means responsive to the DC feedback signal voltage for filtering out any superimposed 60 Hertz AC frequency component, and difference amplifier circuit means responsive to the output filtered DC feedback signal voltage and to the control signal voltage representative of the magnitude of the AC coil current for deriving an output difference control signal voltage for controlling operation of said means for deriving the output DC coil excitation current.

6. A control system according to claim 5 wherein said last-mentioned means for deriving the output DC coil excitation current comprises phase controlled rectifier circuit means supplied with alternating current from a source of alternating current power, said phase controlled rectifier circuit means serving to rectify a portion of the AC supply in proportion to the magnitude of the difference control signal voltage and supplying the output quasi-proportionally controlled rectified DC excitation current to the linear motor DC coil.

7. A control system according to claim 6 wherein said phase controlled rectifier means comprises silicon control rectifier (SCR) means having the load terminals thereof interconnected with the AC power source and with voltage holding circuit means connected to and supplying the DC field coil with quasi-proportionally rectified and filtered DC current supplied through the SCR means, and further includes SCR driver gating circuit means responsive to the difference control signal voltage and the AC supply voltage from the AC power source, the SCR means having the gate electrode thereof coupled to the output from the SCR driver gating circuit means for gating on the SCR means at particular points in the phase of the AC supply voltage as determined by the magnitude of the difference control signal voltage.

8. A control system according to claim 7 wherein said AC coil current sensing means derives an AC control signal voltage representative of the magnitude of the AC coil current and the control system further includes ac signal to DC signal converter means responsive to the AC coil current sensing means output for converting the AC control signal voltage to a DC control signal voltage representative of the AC coil current magnitude, said DC control signal voltage being supplied to one input of said difference amplifier circuit means along with the filtered DC feedback signal voltage for deriving the output difference control signal voltage for application to the SCR driver gating circuit means for controlling turn-on of the SCR means at particular points in the phase of the AC supply voltage.

9. A method for operating electrodynamic linear reciprocating motors having both DC and AC field coil windings for producing electromagnetic fields that induce linear reciprocating motion of a magnetically permeable armature member comprising a part of the motor; said method comprising quasi-proportionally controlling the magnitude of the DC excitation current supplied to the DC field coil windings of the linear motor in proportion to the magnitude of the AC excitation current supplied to the AC field coil windings of the motor.

10. A method of operating electrodynamic linear motors according to claim 9 wherein said method is further characterized by sensing the magnitude of the AC excitation current flowing in the AC field coil windings and deriving a control signal voltage representative of the AC field coil current and phase control rectifying alternating current supplied from the same AC power source supplying the SCR driver-gating circuit in response to the control signal voltage to thereby derive the DC excitation current which is quasi-proportional to the AC field coil excitation current.

11. A method of operating electrodynamic linear motors according to claim 10 further including sensing the value of the DC excitation current flowing in the DC field coil windings and deriving a DC feedback signal voltage representative of the magnitude of the DC coil current, comparing the DC feedback signal voltage to the control signal voltage representative of the AC field coil current magnitude and deriving an output difference signal voltage signal whose magnitude and polarity is representative of any difference and controlling the phase control rectifying operation in response to the difference signal voltage.

* * * * *